United States Patent
Kobayashi et al.

(10) Patent No.: US 7,055,824 B2
(45) Date of Patent: Jun. 6, 2006

(54) LIP-TYPE HIGH PRESSURE SEAL

(75) Inventors: Osamu Kobayashi, Tsukuba (JP);
Hideyuki Tokumitsu, Tsukuba (JP)

(73) Assignee: NOK Corporation, Tokyo (JP)

( * ) Notice: Subject to any disclaimer, the term of this patent is extended or adjusted under 35 U.S.C. 154(b) by 46 days.

(21) Appl. No.: 11/006,783

(22) Filed: Dec. 8, 2004

(65) Prior Publication Data
US 2005/0151322 A1 Jul. 14, 2005

Related U.S. Application Data

(62) Division of application No. 10/018,297, filed as application No. PCT/JP00/03859 on Jun. 14, 2000, now abandoned.

(30) Foreign Application Priority Data

Jun. 18, 1999 (JP) ................................. 11-171871
Aug. 3, 1999 (JP) ................................. 11-219445

(51) Int. Cl.
*F16J 15/32* (2006.01)
(52) U.S. Cl. ...................................... 277/309; 277/569
(58) Field of Classification Search ........ 277/549–570, 277/572–573, 576–577, 309
See application file for complete search history.

(56) References Cited

U.S. PATENT DOCUMENTS

| | | | | |
|---|---|---|---|---|
| 2,804,324 A | * | 8/1957 | Stallings | 277/569 |
| 2,804,325 A | * | 8/1957 | Riesing | 277/559 |
| 3,495,843 A | * | 2/1970 | Andersen et al. | 277/505 |
| 3,956,817 A | * | 5/1976 | Blumenkranz | 29/446 |
| 4,258,927 A | * | 3/1981 | Cather, Jr. | 277/309 |
| 4,274,641 A | * | 6/1981 | Cather, Jr. | 277/309 |
| 4,750,747 A | * | 6/1988 | Holzer | 277/559 |
| 5,368,312 A | * | 11/1994 | Voit et al. | 277/589 |
| 5,860,656 A | * | 1/1999 | Obata et al. | 277/559 |
| 6,123,514 A | * | 9/2000 | Kawaguchi et al. | 417/222.2 |
| 6,164,660 A | * | 12/2000 | Goodman | 277/556 |
| 6,398,515 B1 | * | 6/2002 | Yokomachi et al. | 417/201 |

FOREIGN PATENT DOCUMENTS

| | | | |
|---|---|---|---|
| DE | 29713153 U1 | * | 9/1997 |
| EP | 189842 A | * | 8/1986 |
| JP | 2-110760 | | 5/1990 |
| JP | 2-146269 | | 12/1990 |
| JP | 03-102658 | | 4/1991 |
| JP | 04323235 A | * | 11/1992 |
| JP | 07-293706 | | 11/1995 |

(Continued)

*Primary Examiner*—Vishal Patel
(74) *Attorney, Agent, or Firm*—Jacobson Holman PLLC

(57) ABSTRACT

A high pressure shaft seal (10A) for use in a refrigerating machine wherein carbon dioxide is used as a refrigerant in lieu of "Freon". The seal has a sealing lip (24A) made of a non-elastomeric polymer material such as nylon that has a small gas permeability coefficient, a region of the sealing lip brought into contact with a shaft to be sealed being lined with a low friction lining (26A) of polytetrafluoroethylene. The gas barrier sealing lip (24A) of nylon serves to effectively block permeation of carbon dioxide gas under an extremely high pressure of from about 4 MPa to about 12 MPa. The sealing lip (24A) of nylon has a relatively high rigidity but is nevertheless able to resiliently undergo elastic deformation when such a high pressure is applied, to thereby resiliently follow any shaft run-out to exhibit sufficient dynamic and static sealing functions.

9 Claims, 3 Drawing Sheets

FOREIGN PATENT DOCUMENTS

| | | |
|---|---|---|
| JP | 10-325466 | 12/1998 |
| JP | 10-325467 | 12/1998 |
| JP | 11-125337 | 5/1999 |
| JP | 11-218221 | 8/1999 |

* cited by examiner

LIP-TYPE HIGH PRESSURE SEAL

TECHNICAL FIELD

This is a divisional of application Ser. No. 10/018,297 filed Mar. 11, 2002 now abandoned, which in turn is a nationalization of PCT/JP00/03859, filed Jun. 14, 2001 and published in Japanese. nationalization of PCT/JP00/03859, filed Jun. 14, 2001, the entire specification, claims and drawings of which are incorporated herewith by reference.

The present invention relates to a lip-type high pressure seal for establishing a fluid seal between relatively rotatable shaft and housing and, more particularly, is concerned with a lip-type seal which is suitable for sealing a highly permeable gas such as supercritical carbon dioxide gas. The present invention also relates to a method for establishing a fluid seal between a shaft and a housing against an extremely high fluid pressure.

BACKGROUND ART

When a compressor is used to compress a refrigerant, such as "Freon", charged in a refrigerating circuit of an air conditioning system, it has been customary to use a lip-type high pressure seal in order to seal a shaft of the compressor.

The conventional lip-type high pressure seal is comprised of a first sealing lip made of a low friction material such as "Teflon" (polytetrafluoroethylene. PTFE) and a second sealing lip made of a resilient elastomeric material such as nitrite rubber or fluorine rubber, as described, for example, in JP-U-2-146269, JP-U-2-110760, JP-U-3-102658 and JP-A-11-125337.

The second sealing lip made of the resilient elastomeric material primarily serves to provide a static seal when the shaft is not rotating.

PTFE which forms the first sealing lip is relatively self-sustaining or stiff as compared with the elastomeric material forming the second sealing lip and has an excellent wear resistivity and heat resistivity, so that the first sealing lip is able to well withstand a high pressure refrigerant.

Furthermore, the first sealing lip made of PTFE is provided, on the inner circumferential face thereof in contact with the compressor shaft, with helical pumping elements adapted to hydrodynamically pump a fluid such as a lubricant, that has leaked from the sealed side to the atmospheric side, back to the sealed side, so that the first sealing lip functions to provide a dynamic seal when the shaft is rotating.

In order to avoid destruction of the ozone layer by "Freon" and to thereby preserve the global environment, proposed today in the art is the use of hydrocarbons, ammonia and carbon dioxide which may be used as a refrigerant in place of "Freon". Among these, carbon dioxide is considered preferable from the view point of environmental contamination and safety as it is harmless.

However, the problem which must be overcome in realizing a refrigerating system wherein carbon dioxide gas is used as a refrigerant is that the shaft seals of the compressor are subjected to an extremely high pressure which has never been experienced before in the field of fluid seals. More specifically, referring to the Moldier diagram shown in FIG. 1, in contrast to the conventional refrigerating circuit wherein "Freon 134a" is used as the refrigerant so that the refrigerant pressure remains in the range of about 0.4–1.4 MPa, it is anticipated that, in a refrigerating system wherein carbon dioxide is used, the pressure of carbon dioxide gas entering the compressor will be as extremely high as about 4–12 MPa.

In addition to the fact that the shaft seals of the compressor are subjected to carbon dioxide at extremely high gas pressure of about 4–12 MPa as aforementioned, the carbon dioxide gas inherently has a good affinity to a polymer material and is, therefore, highly permeable to the polymer material. As a result, carbon dioxide gas charged in a refrigerating circuit would be prematurely lost if the conventional lip seals made of PTFE and rubber are used. In this regard, according to the testing and experiments carried out by the present inventors, it has been found that the conventional material such as PTFE and rubber which has been used to form the conventional lip seals exhibits a high permeability against carbon dioxide gas so that the amount of carbon dioxide gas leakage which would occur under a high gas pressure of more than about 4 MPa would be prohibitive in realizing a commercially feasible refrigerating circuit.

The second problem which the shaft seals of the compressor must overcome in realizing the refrigerating system wherein carbon dioxide gas is used as a refrigerant is that, in the course of the refrigerating cycle of the refrigerating machine, carbon dioxide gas is caused to pass a supercritical state. As shown in the phase diagram of FIG. 2, carbon dioxide gas becomes a supercritical gas at a temperature higher than the critical temperature of 31.06° C. and at a pressure higher than the critical pressure of 7.38 MPa. As supercritical carbon dioxide gas exhibits a density which is closer to that of a liquid than a gas, it is soluble in a large amount into the PTFE material forming the lip-type seal. Carbon dioxide gas having been dissolved into the material will evaporate when the pressure of the refrigerating circuit is lowered, thereby causing foaming of the PTFE material. As a result, PTFE forming the lip-type seals will be degraded and destroyed by repeated dissolution and foaming of the supercritical carbon dioxide gas so that the mechanical strength of the lip-type seals will be prematurely lost.

Another problem of the refrigerating circuit using carbon dioxide gas is that, due to the high pressure of carbon dioxide gas which pressure is as high as about 4–12 MPa, the lip-type seals will be locally subjected to a tensile effort which would surpass the limit of elasticity of PTFE. As PTFE has a relatively low modulus of elasticity, the sealing lip made of PTFE will undergo local plastic deformation and, hence, permanent deformation to thereby result in a loss or degradation of the static sealing capability if a tensile stress surpassing the elasticity limit of PTFE is exerted.

Accordingly, an object of the present invention is to provide a high pressure shaft seal which is suitable for sealing a gas under an extremely high pressure and which can be used in a refrigerating system wherein carbon dioxide gas is used as a refrigerant.

Another object of the invention is to provide a high pressure shaft seal which is suitable for sealing a highly permeable gas such as supercritical carbon dioxide gas.

A still further object of the invention is to provide a method for establishing fluid seal between a compressor shaft and a housing against an extremely high fluid pressure which may be encountered in a refrigerating system wherein carbon dioxide gas is used as a refrigerant.

A further object of the invention is to provide a shaft seal which is able to exhibit a good sealing capability under a high fluid pressure which may reach as high as about 12 MPa.

DISCLOSURE OF THE INVENTION

According to the invention, the lip-type high pressure seal comprises an annular metallic casing, an annular sealing lip secured to the casing, and a low friction lining bonded to the sealing lip. The feature of the lip-type high pressure seal is that the sealing lip is made of a highly gas-barrier, non-elastomeric, polymer material such as polyamide (nylon), polyvinylidene fluoride, polyvinyl chloride, poly-chlorotrifluoroethylene, and polyvinyl alcohol.

Preferably, the highly gas barrier polymer material forming the sealing lip has a gas permeability coefficient of less than $1.0\times10^{-13}$ ($cm^3 \cdot cm/cm^2 \cdot sec \cdot Pa$), more preferably less than $1.0\times10^{-14}$ ($cm^3 \cdot cm/cm^2 \cdot sec \cdot Pa$), for carbon dioxide gas under a pressure of 4 MPa.

As the sealing lip is thus made of a highly gas-barrier polymer material, the sealing lip, on the one hand, effectively prevents permeation of high pressure carbon dioxide gas whereby leakage of carbon dioxide gas is limited and minimized for a prolonged period of time.

The highly gas-barrier polymer material forming the sealing lip, in addition, has a relatively high rigidity as compared with a resilient elastomer such as rubber. Accordingly, the sealing lip is able to well withstand a high pressure of about 4–12 MPa prevailing in a refrigerating circuit wherein carbon dioxide gas is used as a refrigerant.

However, when such a high pressure is exerted, the sealing lip made of a non-elastomeric polymer material such as polyamide will nevertheless be able to resiliently undergo elastic deformation so that the sealing lip under the action of a high pressure gas will behave as if it has a sufficient resiliency. Accordingly, the sealing lip, on the other hand, will be able to resiliently follow any shaft run-out, thereby exhibiting sufficient dynamic and static sealing functions.

Preferably, the polymer material forming the sealing lip has a high modulus of elasticity. The sealing lip made from the polymer material having a high modulus of elasticity will withstand repeated dissolution and foaming of the supercritical carbon dioxide gas for a long period of time, without being destroyed or damaged by foaming of carbon dioxide gas dissolved into the material. Furthermore, the sealing lip will not undergo plastic deformation even when subjected to a high local effort resulting from the high pressure carbon dioxide gas, so that the static sealing capability is maintained.

The low friction lining serves to reduce the sliding friction of the sealing lip and to thereby prevent heat generation. This protects the polymer material such as polyamide forming the essential portion of the sealing lip from being subjected to a thermal load.

In a preferred embodiment, the low friction lining is made of polytetrafluoroethylene (PTFE) and covers only that part of the sealing lip which is brought into contact with the shaft to be sealed.

With this arrangement, the low friction lining which is made of PTFE having a relatively low modulus of elasticity will be exempted from a high tensile force and any localized efforts will be supported mainly by the highly gas-barrier polymer material such as polyamide which advantageously has a high modulus of elasticity. As a result, the sealing lip will be free from plastic deformation.

Preferably, the ratio of the radial thickness of the low friction lining with respect to the radial thickness of the sealing lip is less than 20%, preferably less than 10%, more preferably less than 5%. With this arrangement, the thickness of the gas-barrier layer necessary to minimize gas leakage can be secured.

In another aspect, this invention provides a method for establishing fluid seal between a housing containing a high pressure gas and a shaft rotating relative to the housing. The method is characterized by comprising the steps of:
providing a lip-type seal having an annular sealing lip made from a highly gas-barrier, non-elastomeric, polymer material;
lining the inner circumferential face of the sealing lip with a low friction lining;
installing the lip-type seal between the shaft and the housing in such a manner that only the low friction lining is brought into contact with the shaft; and, applying a gas pressure higher than about 3 MPa to the fluid side of the seal as the shaft and housing are rotated relative to each other to thereby cause the low friction lining to resiliently follow any shaft run-out under the action of high pressure gas, while substantially preventing permeation of gas by the highly gas-barrier nature of the sealing lip.

These features and advantages of the invention, as well as other features and advantages thereof, will become apparent from the following description made with reference to the preferred embodiments thereof.

BEST MODE FOR CARRYING OUT THE INVENTION

Figure 3:
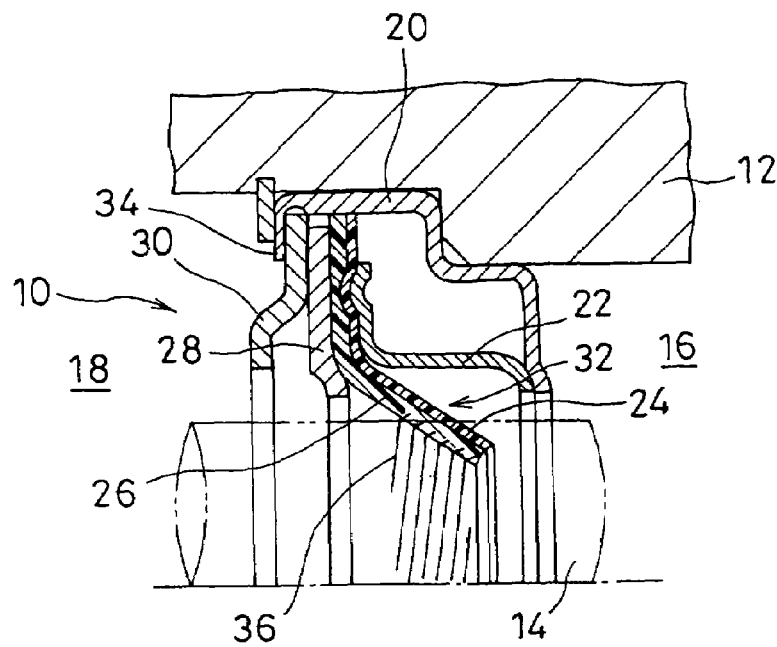
FIG. 3 is a cross-sectional view of the lip-type seal according to the first embodiment of the invention.

Referring to FIG. 3 wherein the first embodiment of the invention is shown, the lip-type shaft seal 10 is arranged to establish fluid seal between a housing 12 and a shaft 14 of a compressor of a refrigerating machine, the compressor housing 12 being charged with a high pressure carbon dioxide gas serving as a refrigerant of the refrigerating circuit. According to the ordinary terminology in the field of fluid seals, the inner side of the housing 12 with respect to the shaft seal 10 will be referred-to hereinafter as "sealed side", "fluid side" or "pressure side" 16, with the opposite side being referred to as "atmospheric side" 18.

The shaft seal 10 includes a metallic annular outer casing 20 press-fitted in a mounting bore of the housing 12, a metallic inner ring 22, a highly gas-barrier annular sealing lip 24 made of "nylon" (polyamide), a low friction lining 26 covering the pressure side of the sealing lip 24 and made of polytetrafluoroethylene (PTFE), a backup ring 28, and a retaining ring 30.

In lieu of nylon, the sealing lip 24 may be made from other highly gas-barrier polymer material such as polyvinylidene fluoride, polyvinyl chloride, poly-chlorotrifluoroethylene, and polyvinyl alcohol. However, nylon is most preferable because of its excellent heat resistivity.

In the illustrated embodiment, the low friction lining 26 covers the entire atmospheric-side surface of the sealing lip 24. The low friction lining 26 of PTFE is bonded to the sealing lip 24 by way of co-extrusion process, bonding process, or heat sealing process to thereby form a unitary composite lip 32.

The shaft seal 10 is assembled by positioning the inner ring 22 within the outer casing 20, placing the composite lip 32 sandwiched between the inner ring 22 and the backup ring 28, positioning the retaining ring 30 at the atmospheric side of the backup ring 28, and crimping inwardly the edge 34 of the outer casing 20.

In its relaxed free state, the composite lip 32 has an inner diameter smaller than the outer diameter of the shaft 14 to ensure that a predetermined amount of interference is developed as it is fitted over the shaft 14.

In the illustrated embodiment, the inner circumferential face of the low friction lining 26 is provided with a plurality of helical pumping elements 36 of the conventional design in order to hydrodynamically return a fluid, which has leaked from the sealed side of the shaft seal to the atmospheric side, back to the sealed side. In this embodiment, the pumping elements 36 are comprised of helical grooves formed on the inner circumferential face of the low friction lining 26 by knife cutting. In order to avoid degradation of the static sealing function, the pumping elements 36 are terminated before the inner circumferential edge of the low friction lining 26.

Figure 1:
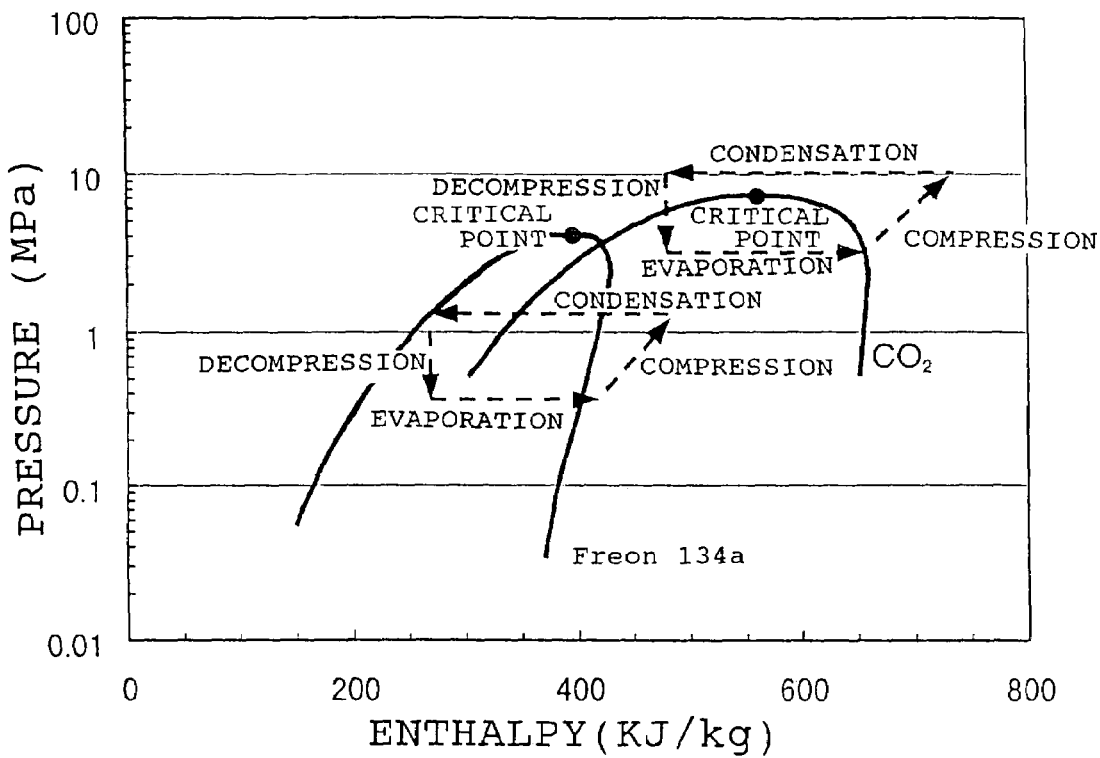
FIG. 1 is a Moldier diagram of refrigerating circuits wherein "Freon 134a" and carbon dioxide gas are used, respectively, as a refrigerant.
Figure 2:
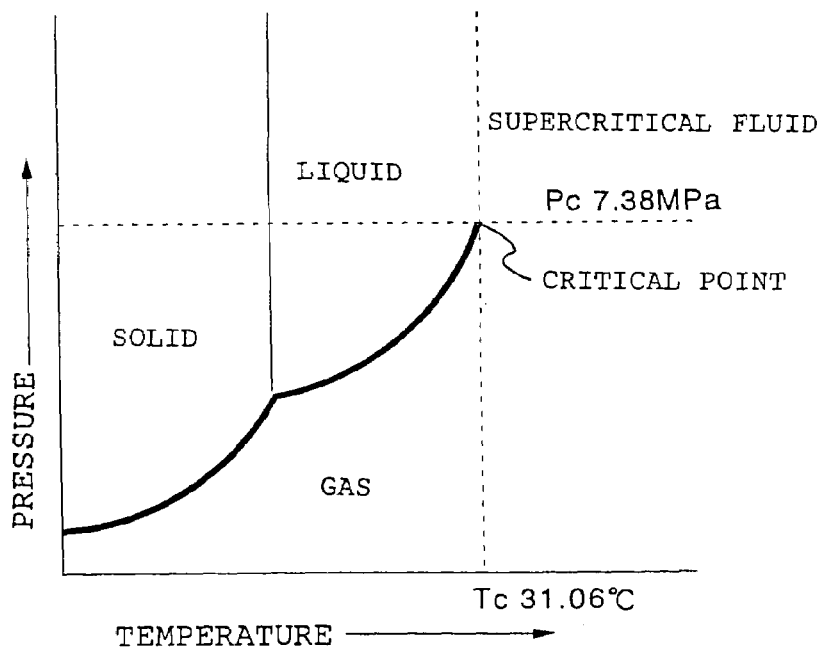
FIG. 2 is a phase diagram illustrating the phase transition of carbon dioxide gas in response to variation in pressure and temperature.

In use, in the non-operative condition of the compressor, the pressure of carbon dioxide gas being present within the housing 12 of the compressor will be at an extremely high level which may reach about 12 MPa as will be understood from the graph of FIG. 1. However, "nylon" that forms the sealing lip 24 will effectively prevent permeation of carbon dioxide gas under high pressure as it has a high gas barrier capability.

Figure 4:
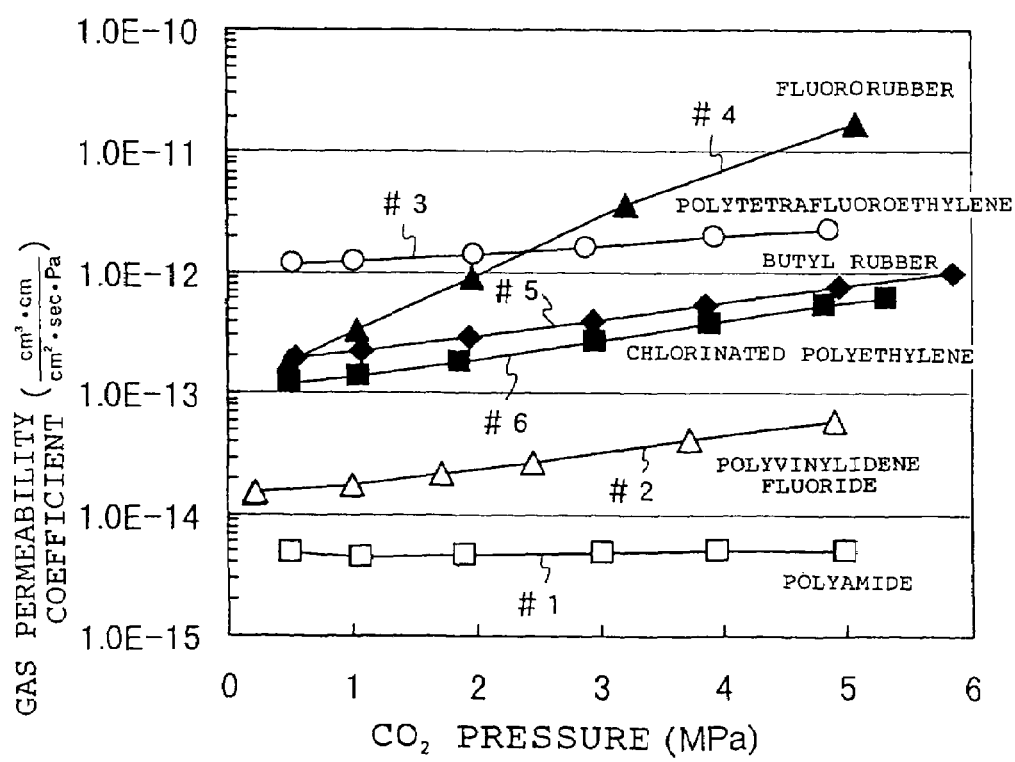
FIG. 4 is a graph showing the gas permeability coefficient of various polymer materials with respect to carbon dioxide gas under varying pressure.

In FIG. 4, there are shown the gas permeability coefficient of nylon and various other polymer materials as measured for carbon dioxide gas under varying pressure. In the graph, #1, #2, #3, #4, #5 and #6 plots show, respectively, the gas permeability coefficient of polyamide ("nylon 6"), polyvinylidene fluoride, PTFE, fluorine rubber, butyl rubber, and chlorinated polyethylene. As will be understood from the graph, PTFE has a gas permeability coefficient greater than $1.0 \times 10^{-12}$ ($cm^3 \cdot cm/cm^2 \cdot sec \cdot Pa$). Also, those elastomers, such as fluorine rubber, butyl rubber, and chlorinated polyethylene, which have been conventionally used in ordinary seals have a high gas permeability coefficient.

In contrast, "nylon 6" has a low gas permeability coefficient of less than $1.0 \times 10^{-14}$ ($cm^3 \cdot cm/cm^2 \cdot sec \cdot Pa$) for carbon dioxide gas under a pressure of 4 MPa and thus presents a high gas barrier property. Also, polyvinylidene fluoride has a gas permeability coefficient of less than $1.0 \times 10^{-13}$ ($cm^3 \cdot cm/cm^2 \cdot sec \cdot Pa$) for carbon dioxide gas under a pressure of 4 MPa and thus presents a good gas barrier property.

Since nylon has a relatively high rigidity, the sealing lip 24 is able to well withstand the high pressure of carbon dioxide gas. Nevertheless, the sealing lip 24 is still able to resiliently flex under the action of the high pressure carbon dioxide gas thereby allowing the low friction lining 26 to be brought into tight and snug contact with the shaft 16. In this manner, the static sealing function of the shaft seal 10 is fulfilled owing to the high gas barrier capability as well as the resiliency of the sealing lip 24.

In the operative condition of the compressor, the power loss and heat generation resulting from sliding friction will be limited to the minimum because only the low friction lining 26 of PTFE is in sliding contact with the shaft 14. Furthermore, as PTFE has an excellent wear resistivity, wear of the low friction lining 26 is limited.

Likewise, in the low pressure condition on the order of 4 MPa of the compressor, the highly gas-barrier sealing lip 24 will also effectively prevent permeation of carbon dioxide gas. Moreover, the pressure of carbon dioxide gas will cause the sealing lip 24 of nylon to resiliently undergo elastic deformation, so that the low friction lining 26 will be caused to resiliently follow any run-out of the shaft 14.

Furthermore, in response to the rotation of the shaft 14, the helical pumping elements 36 provided on the inner circumferential face of the low friction lining 26 will act to hydrodynamically return the fluid such as lubricant, which has leaked from the sealed side to the atmospheric side, back to the sealed side. In this way, the dynamic sealing function of the shaft seal 10 is fulfilled owing to the gas barrier function of the sealing lip 24, the ability of the sealing lip to follow the shaft run-out, and the pumping action of the pumping elements 36.

Figure 5:
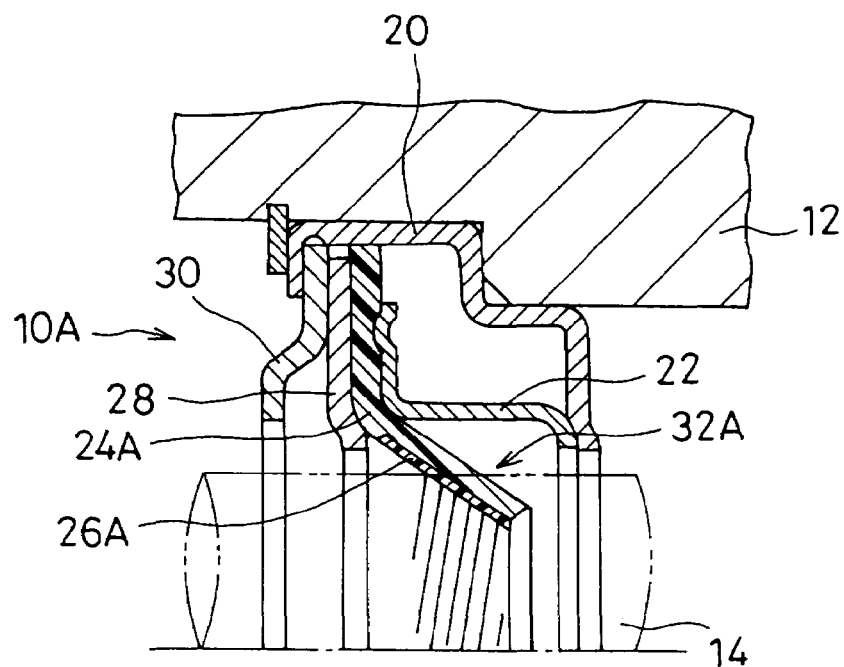
FIG. 5 is a cross-sectional view of the lip-type seal according to the second embodiment of the invention; and, FIG. 6 is a cross-sectional view of the lip-type seal according to the third embodiment of the invention.

FIG. 5 illustrates the lip-type shaft seal according to the second embodiment of the invention. In FIG. 5, parts and members similar to those of the first embodiment shown in FIG. 3 will be indicated by like reference numerals. To describe only the difference, in this embodiment the composite lip 32A of the shaft seal 10A has a nylon sealing lip 24A having an increased thickness and the low friction lining 26A of PTFE is arranged to cover only that part of the sealing lip 24A which is brought into contact with the shaft 14. As described hereinbefore, the low friction lining 26A may be bonded to the sealing lip 24A by way of co-extrusion process, bonding process, or heat sealing process.

The low friction lining 26A is made thin as compared with the sealing lip 24A in such a manner that the ratio of the radial thickness of the low friction lining 26A with respect to the radial thickness of the sealing lip 24A is less than 20%.

Accordingly, in this embodiment, the gas barrier capability of the sealing lip is enhanced because, by providing the low friction lining 26A only on the contact region with the shaft, the wall thickness of the remaining region of the nylon sealing lip 24A is increased and since, even in the contact region with the shaft, the wall thickness of the nylon layer is secured by limiting the thickness of the low friction lining 26A.

Furthermore, as the sealing lip 24A subjected to the high pressure of gas is made from nylon that has a high modulus of elasticity, it will not undergo permanent deformation even in the event that any localized tensile force is exerted by the gas pressure, so that the sealing lip will continue to exhibit an excellent static seal function for a long period of time.

Figure 6:
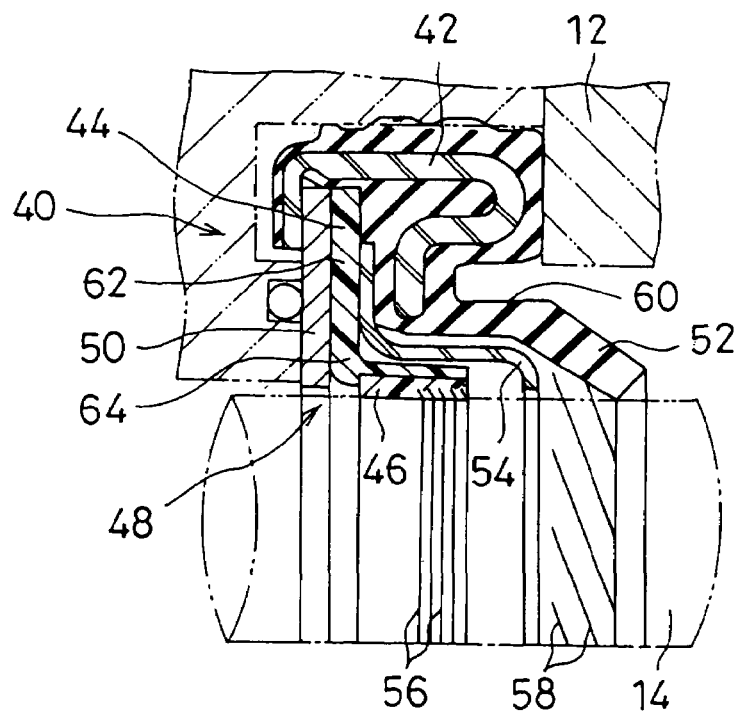

FIG. 6 illustrates the shaft seal according to the third embodiment of the invention. The feature of this embodiment is that, in addition to the composite sealing lip comprised of nylon and PTFE, a second sealing lip made of a resilient elastomer is provided.

Referring to FIG. 6, the shaft seal 40 includes an annular metallic casing 42, a first sealing lip 48 comprised of a composite of nylon layer 44 and PTFE layer 46, a first backup ring 50 to backup the first sealing lip 48, a second sealing lip 52 made of a resilient elastomer such as rubber, and a backup ring 54 to backup the second sealing lip 52.

Helical pumping elements 56 and 58 are provided, respectively, on the inner circumferential faces of the PTFE layer 46 and on the second sealing lip 52.

The second sealing lip 52 is bonded to the metallic casing 42 by an insert molding process. Similar to the foregoing embodiments, the component parts of the shaft seal 40 are assembled together by inwardly crimping the edge of the metallic casing 42.

In this embodiment, also, the PTFE layer 46 of the gas-barrier sealing lip 48 is provided only on the contact region with the shaft 14. While the thickness of the PTFE layer 46 of the gas-barrier sealing lip 48 is shown exaggerated in order to clarify the drawing, the radial thickness of the PTFE layer is preferably less than 20% of the total thickness of the composite sealing lip 48.

In this embodiment, the PTFE layer 46 of the sealing lip 48 is terminated before the junction 64 between the cylindrical portion 60 and the radial portion 62 of the nylon layer 44 to ensure that the junction 64 is formed by nylon. Accordingly, when the gas pressure is applied to the sealing lip 48, the PTFE layer 46 will be subjected only to a radially inwardly directed compressive force so that the PTFE layer 46 will be exempted from any tensile force. While the junction 64 between the cylindrical portion 60 and the radial portion 62 of the nylon layer 44 is subjected to a localized tensile force, the sealing lip 48 will not undergo plastic deformation because such force is withstood by nylon which has a high modulus of elasticity.

This embodiment has the advantage that the static sealing function is enhanced since, in addition to the gas-barrier sealing lip 48, the second sealing lip 52 of elastomer is provided.

EXAMPLE 1

A sheet (0.6 mm in thickness) of PTFE ("Teflon 7-J" made by Mitsui-DuPont Fluorochemical), blended with 20% by weight of carbon powder (CMW-350 made by Chuetsu Graphite) to enhance the wear resistivity, and a sheet (0.5 mm in thickness) of nylon ("Diamilon C–Z" made by Mitshibishi Jushi) were subjected to hot rolling to form a laminated sheet having a total thickness of 1 mm which was then punched into donut-shaped blanks which were heat-formed to obtain #1 sealing lips.

The #1 sealing lips thus prepared, having a lip inner diameter of 10 mm, were mounted to a rotary shaft-type sliding tester and subjected to $CO_2$ leakage measurement under the condition of a circumferential speed of 1 m/sec at $CO_2$ pressure of 50 atm (5.07 MPa), the measured $CO_2$ leakage being 2.3 $cm^3$ per 24 hours.

Sealing lips were made in a similar manner by using, in place of the nylon sheet, a sheet of polyvinylidene fluoride ("Neofreon VDF" made by Daikin Kogyo), a sheet of poly-chlorotrifluoroethylene ("Neofreon CTFE" made by Daikin Kogyo), a sheet of polyvinyl alcohol (PVA-105 made by Kuraray), and a sheet of polyvinyl chloride (ZEST800Z made by Shin Dai-ichi Enbi), respectively, and were tested by the same sliding tester. The measured $CO_2$ leakage per 24 hours was 6.9 $cm^3$, 3.1 $cm^3$, 2.8 $cm^3$, and 2.5 $cm^3$, respectively.

For the purpose of comparison, sealing lips made solely of PTFE were prepared without using a nylon sheet. Upon testing in the similar manner, the measured $CO_2$ leakage per 24 hours were 27.2 $cm^3$.

EXAMPLE 2

Donut-shaped blanks having an outer diameter of 35 mm and an inner diameter of 10 mm and made by punching a sheet (1.5 mm thick) of nylon ("Diamilon C-Z" made by Mitshibishi Jushi) and donut-shaped blanks having an outer diameter of 15 mm and an inner diameter of 10 mm and made by punching a sheet (0.1 mm thick) of PTFE ("Teflon 7J" made by Mitsui-DuPont Fluorochemical), blended with 20% by weight of carbon powder (CMW-350 made by Chuetsu Graphite), were superposed in a concentric fashion and were heat pressed to form #1 sealing lips. The ratio of the thickness of the PTFE sheet with respect to the thickness of the nylon sheet was 6.25%.

The #1 sealing lips thus prepared were mounted to the sliding tester and subjected to carbon dioxide gas leakage measurement under the condition of carbon dioxide gas pressure of 1 atm (0.101 MPa) and 60 atm (6.08 MPa), respectively, while the tester shaft was rotated (circumferential speed of 1 m/sec) and held stationary, respectively. After the sliding test, the #1 sealing lips were dismounted from the tester and were visually inspected for the presence and absence of any permanent deformation.

2 sealing lips were made in a similar manner by changing the thickness of the nylon sheet to 1.0 mm and the thickness of the carbon added PTFE sheet to 0.1 mm so that the thickness ratio was 9.1%.

In a similar manner, #3 sealing lips were made by changing the thickness of the nylon sheet to 1.0 mm and the thickness of the carbon added PTFE sheet to 0.2 mm so that the thickness ratio was 16.7%.

For the purpose of comparison, in the #1 sealing lips, the thickness of the nylon sheet was changed to 0.5 mm and the thickness of the carbon added PTFE sheet was changed to 0.6 mm to obtain #4 sealing lips wherein the thickness ratio was 54.5%.

Also, for the purpose of comparison, in the #2 sealing lips, a sheet of polyvinyl alcohol (PVA-105 made by Kuraray), a sheet of polyvinyl chloride (ZEST800Z made by Shin Dai-ichi Enbi), and a sheet of poly-chlorotrifluoroethylene ("Neofreon CTFE" made by Daikin Kogyo), respectively, were used in place of the nylon sheet to obtain #5–#7 sealing lips.

The #2–#7 sealing lips thus prepared were mounted to the sliding tester and subjected to carbon dioxide gas leakage measurement under the condition of carbon dioxide gas pressure of 1 atm and 60 atm, respectively, while the tester shaft was rotated (circumferential speed of 1 m/sec) and held stationary, respectively. Similarly, the respective sealing lips were dismounted from the tester after the sliding test and were visually inspected for the presence and absence of any permanent deformation.

The results of the above-mentioned measurement and inspection are given in the following table.

TABLE

|  | #1 | #2 | #3 | #4 | #5 | #6 | #7 |
|---|---|---|---|---|---|---|---|
| Amount of $CO_2$ leakage (1 atm) | | | | | | | |
| rotational ($cm^3$/24 hrs) | 0.2 | 0.3 | 0.3 | 0.5 | 0.3 | 0.3 | 0.3 |
| stational ($cm^3$/24 hrs) | 0.1 | 0.1 | <0.1 | 0.5 | 0.6 | 0.6 | 0.7 |
| Amount of $CO_2$ leakage (60 atm) | | | | | | | |
| rotational ($cm^3$/24 hrs) | 2.3 | 2.9 | 3.2 | 4.5 | 3.1 | 3.4 | 3.5 |
| stational ($cm^3$/24 hrs) | 0.4 | 0.5 | 0.3 | 5.0 | 6.6 | 6.5 | 5.7 |
| Presence and absence of permanent deformation | | | | | | | |
| by visual inspection | none | none | very small | large | very large | very large | large |

By comparing the amount of leakage occurred in the #1–#4 sealing lips as shown in the table, it will be understood that, when the thickness ratio of the PTFE sheet with respect to the nylon sheet exceeds 20%, the gas barrier thickness of the sealing lip becomes insufficient thereby causing the amount of leakage of carbon dioxide gas to increase and a permanent deformation is resulted.

Furthermore, as will be understood upon comparing the results of the #5–#7 sealing lips with that of the #2 sealing lips, the #2 sealing lips comprising a nylon sheet are subject to less permanent deformation and exhibit a higher sealing capability as compared with those sealing lips comprising polyvinyl alcohol, polyvinyl chloride, or poly-chlorotrifluoroethylene. This is because nylon is superior in heat resistivity than polyvinyl alcohol, polyvinyl chloride, and polychlorotrifluoroethylene and is, therefore, not liable to thermal deformation caused by heat generated by sliding friction.

While the present invention has been described herein with reference to the specific embodiments thereof, it is contemplated that the present invention is not limited thereby and various changes and modification may be made therein. In particular, the present invention is applicable to seals for a gas other than carbon dioxide gas.

The invention claimed is:

1. A method of sealing a refrigerating system having a housing and a shaft, said method comprising
providing carbon dioxide gas in the refrigerating system as a refrigerant filled at a pressure of 4–12 MPa;
establishing a fluid seal between said housing and said shaft rotating relative to said housing;
providing a lip-type seal in the refrigerating system, said seal having an annular sealing lip made from a non-elastomeric, polymer material, said polymer material being a gas barrier material impervious to carbon dioxide gas at said pressure of 4–12 MPa and said polymer material having a gas permeability coefficient of less than $1.0 \times 10^{-13}$ ($cm^3 \cdot cm/cm^2 \cdot sec \cdot Pa$) for carbon dioxide gas at a pressure of 4 MPa;
lining an inner circumferential face of said sealing lip with a low friction lining;
installing said lip-type seal between said shaft and said housing in such a manner that only said low friction lining is brought into contact with said shaft; and,
applying a carbon dioxide gas pressure of 4–12 MPa to a fluid side of said seal as said shaft and said housing are rotated relative to each other to thereby cause said sealing lip to resiliently undergo elastic deformation to cause said low friction lining to resiliently follow any shaft run-out under action of high pressure gas, while substantially preventing permeation of gas by the gas barrier nature of said sealing lip.

2. The method according to claim 1, wherein said sealing lip causes the low friction lining into tight contact with the outer periphery of the shaft under the action of high pressure gas to thereby establish a static seal.

3. The method according to claim 1, wherein said sealing lip is made of polyamide.

4. The method according to claim 1, wherein said sealing lip is made of a polymer material selected from the group consisting of polyvinylidene fluoride, polyvinyl chloride, polychlorotrifluoroethylene, and polyvinyl alcohol.

5. The method according to claim 1, wherein said low friction lining is made of polytetrafluoroethylene.

6. The method according to claim 1, wherein the gas permeability coefficient of said polymer material is less than $1.0 \times 10^{-14}$ ($cm^3 \cdot cm/cm^2 \cdot sec \cdot Pa$) for carbon dioxide gas at the pressure of 4 mPa.

7. The method according to claim 1, wherein a ratio of a radial thickness of the low friction lining to a radial thickness of the sealing lip is less than 20%.

8. The method according to claim 7, wherein the ratio is less than 10%.

9. The method according to claim 8, wherein the ratio is less than 5%.

* * * * *